United States Patent
AlSharif

(10) Patent No.: US 12,065,612 B1
(45) Date of Patent: Aug. 20, 2024

(54) BISTABLE SYSTEM FOR THE CONTROLLED RELEASE OF CORROSION INHIBITORS

(71) Applicant: Saudi Arabian Oil Company, Dhahran (SA)

(72) Inventor: Layan Alaeddin AlSharif, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/360,426

(22) Filed: Jul. 27, 2023

(51) Int. Cl.
  *C09K 8/54* (2006.01)
  *C09K 8/035* (2006.01)

(52) U.S. Cl.
  CPC ............ *C09K 8/54* (2013.01); *C09K 8/035* (2013.01); *C09K 2208/32* (2013.01)

(58) Field of Classification Search
  None
  See application file for complete search history.

(56) References Cited

U.S. PATENT DOCUMENTS

| | | | |
|---|---|---|---|
| 9,538,775 B2 | 1/2017 | Sexton et al. | |
| 10,131,995 B2 | 11/2018 | Li et al. | |
| 10,317,372 B2 * | 6/2019 | Carrasco Zanini | G01N 29/225 |
| 11,084,966 B2 | 8/2021 | Burns et al. | |
| 11,235,823 B2 * | 2/2022 | Abdelkader | B60R 11/00 |
| 11,808,663 B2 * | 11/2023 | Al-Hashmy | G01M 3/002 |
| 2013/0302392 A1 | 11/2013 | Mistry et al. | |
| 2019/0382653 A1 | 12/2019 | Borrell et al. | |
| 2022/0395879 A1 * | 12/2022 | Canto Maya | B09C 1/08 |

FOREIGN PATENT DOCUMENTS

| | | |
|---|---|---|
| CN | 106255654 | 12/2016 |
| CN | 107540851 | 4/2021 |

OTHER PUBLICATIONS

Abu-Thabit et al., "Stimuli-responsive polyelectrolyte multilayers for fabrication of self-healing coatings—a review," Surface and Coatings Technology, Nov. 2015, 303:406-424, 19 pages.
Carraher Jr, "Seymour/Carraher's Polymer Chemistry," CRC Press, 2003, 114 pages.
Cheng, "Monitor safety of aged fuel pipelines," Nature, Jan. 2016, 529(7585), 156-156, 1 page.
Chi et al., "Bistable and Multistable Actuators for Soft Robots: Structures, Materials, and Functionalities," Advanced Materials, 2022, 44 pages.
Chi et al., "Leveraging Monostable and Bistable Pre-Curved Bilayer Actuators for High-Performance Multitask Soft Robots," Advanced Materials Technologies, 2020, 12 pages.
Dong et al., "Controlled release of amylase from a thermal and pH-sensitive, macroporous hydrogel," Journal of Controlled Release, Sep. 1991, 19(1-3): 171-177, 7 pages.

(Continued)

*Primary Examiner* — John J Figueroa
(74) *Attorney, Agent, or Firm* — Fish & Richardson P.C.

(57) ABSTRACT

The disclosure provides bistable systems for the controlled release of corrosion inhibitors, as well as related methods. The systems and methods can release corrosion inhibitors in response to pH conditions. The systems include a bistable dome and a cationic hydrogel.

20 Claims, 4 Drawing Sheets

(56) References Cited

OTHER PUBLICATIONS

Han et al., "Dual pH-Responsive Hydrogel Actuator for Lipophilic Drug Delivery," ACS Applied Materials & Interfaces, Feb. 2020, 21 pages.
Hendi et al., "Healthcare Applications of pH-Sensitive Hydrogel-Based Devices: A Review," International Journal of Nanomedicine, 2020, 3887-3901, 16 pages.
Herber et al., "Exploitation of a pH-sensitive hydrogel disk for CO2 detection," Sensors and Actuators B, Jun. 2004, 103(1-2):284-289, 6 pages.
Jaal et al., "A Review of CO2 Corrosion Inhibition by Imidazoline-Based Inhibitor," MATEC Web of Conferences, Jul. 2014, 13:05012, 4 pages.
Lee et al., "ATRP Synthesis of Amphiphilic Random, Gradient, and Block Copolymers of 2-(dimethylamino) Ethyl Methacrylate and n-Butyl Methacrylate in Aqueous Media," Biomacromolecules, May 2003, 4(5): 1386-1393, 8 pages.
Li et al., "Preparation and characterization of pH-controlled-release intelligent corrosion inhibitor," Materials Letters, Nov. 2013, 116:318-321, 4 pages.
Neu et al., "Fully Polymeric Domes as High-Stroke Biasing System for Soft Dielectric Elastomer Actuators," Frontiers in Robotics and AI, Jun. 2021, 17 pages.
Ren et al., "Preparation and evaluation of intelligent corrosion inhibitor based on photo-crosslinked pH-sensitive hydrogels," Materials Letters, Aug. 2015, 160:480-483, 4 pages.
Richter et al., "Micropumps operated by swelling and shrinking of temperature-sensitive hydrogels," Lab on a Chip, Nov. 2008, 9(4):613-618, 6 pages.
Rizwan et al., "pH sensitive hydrogels in drug delivery: Brief history, properties, swelling, and release mechanism, material selection and applications," Polymers, Apr. 2017, 9(4): 137, 37 pages.
Rothemund et al., "A soft, bistable valve for autonomous control of soft actuators," Science Robotics, Mar. 2018, 3(16):7986, 11 pages.
Seidi et al., "Metal-Organic Framework (MOF)/Epoxy Coatings: A Review," Materials, Jun. 2020, 13(12):2881, 16 pages.
Shchukin et al., "Layer-by-layer assembled nanocontainers for self-healing corrosion protection," Advanced Materials, 2006, 18(13):1672-1678, 7 pages.
Snihirova et al., "pH-sensitive polymeric particles with increased inhibitor-loading capacity as smart additives for corrosion protective coatings for AA2024," Electrochimica Acta, Sep. 2014, 145:123-131, 9 pages.
Taffetani et al., "Static bistability of spherical caps," Proceedings of the Royal Society A: Mathematical, Physical and Engineering Sciences, Apr. 2018, 474(2213):Sep. 10, 2017, 21 pages.
Wang et al. "A CO2-responsive anti-corrosion ethyl cellulose coating based on the pH-response mechanism" Corrosion Science, Dec. 2020, 180:109194, 15 pages.
Wen et al., "An intelligent coating based on pH-sensitive hybrid hydrogel for corrosion protection of mild steel," Chemical Engineering Journal, Dec. 2019, 392:123742, 45 pages.
Yang et al., "A pH-controlled intelligent inhibitor based on PAM hydrogel for steel corrosion protection in wide range pH NaCl medium," 2022, 18 pages.

* cited by examiner

BISTABLE SYSTEM FOR THE CONTROLLED RELEASE OF CORROSION INHIBITORS

FIELD

The disclosure provides bistable systems for the controlled release of corrosion inhibitors, as well as related methods. The systems and methods can release corrosion inhibitors in response to pH conditions. The systems include a bistable dome and a cationic hydrogel.

BACKGROUNDS

Corrosion can cause issues in various oil and gas systems, such as oil and gas production systems, oil and gas transportation systems, oil and gas processing systems and oil and gas storage systems. For example, corrosion can result in pipeline failure in such oil and gas systems. Corrosion inhibitors can be used to reduce (e.g., prevent) corrosion in such oil and gas systems.

SUMMARY

The disclosure provides bistable systems for the controlled release of corrosion inhibitors, as well as related methods. The systems and methods can release corrosion inhibitors in response to pH conditions. The systems include a bistable dome and a cationic hydrogel. The systems and methods can supply corrosion inhibitors in an oil and gas system in situ in response to relatively low pH conditions. The systems and methods can supply the corrosion inhibitors relatively rapidly, spontaneously, non-invasively and in relatively large quantities.

The systems and methods can provide corrosion inhibitors in a simple and homogenous fashion relative to certain other systems and methods for delivering corrosion inhibitors. The systems can have high loading capacities, easy loading, and/or have reduced (e.g., no) uncontrolled leaching, relative to certain corrosion inhibitor encapsulation systems. The systems and methods can have a relatively simple design, fabrication, and implementation without the need for electrical systems, electronic circuits and/or power sources.

The systems and methods can reduce (e.g., prevent) corrosion, thereby reducing (e.g., preventing) environmental and economic consequences of corrosion in an oil and gas system.

In a first aspect, the disclosure provides a system which includes a protective casing including sidewalls including valve-like holes, wherein the sidewalls define a central channel. The central channel includes: a bistable dome configured to have a first state and a second state different from the first state, a cationic hydrogel, and an internal space defined by the sidewalls of the protective casing and the bistable dome. At least a portion of cationic hydrogel is in fluid communication with a space outside the system. In the first state of the bistable dome, the internal space is not in fluid communication with the space outside the system. In the second state of the bistable dome, the internal space is in fluid communication with the space outside the system via the valve-like holes.

In some embodiments, the system further includes a porous cover. The cationic hydrogel includes first and second faces. The first face of the cationic hydrogel faces the bistable dome. The second face of the cationic hydrogel faces the space outside the system. The porous cover is disposed on the second face of the cationic hydrogel. In some embodiments, pores of the porous cover have a size of 0.1 μm to 50 μm. In some embodiments, the system further includes a flexible membrane disposed on the first face of the cationic hydrogel.

In some embodiments, the system is configured so that, when a fluid in contact with the system has a pH below a pKa of the cationic hydrogel, the cationic hydrogel exerts a pressure on the bistable dome, thereby causing the bistable dome to switch from its first state to its second state.

In some embodiments, the system further includes corrosion inhibitors disposed in the internal space. When the bistable dome is in the first state, the corrosion inhibitors are contained in the internal space, and when the bistable dome is in the second state, the corrosion inhibitors are released into the space outside the system.

In some embodiments, the cationic hydrogel has a pKa of 3 to 6.

In some embodiments, the cationic hydrogel includes chitosan, poly (ethylene imine), poly(amido-amine), poly (vinylpyrrolidone) (PVPP) and/or poly(lysine).

In some embodiments, the system further includes corrosion inhibitors disposed in the internal space. When the bistable dome is in the first state, the corrosion inhibitors are contained in the internal space. When the bistable dome is in the second state, the corrosion inhibitors are released into the space outside the system.

In some embodiments, the system further includes an anionic hydrogel disposed in the protective casing. At least a portion of the anionic hydrogel is in fluid communication with the space outside the system. The bistable dome includes first and second faces. The first face of the bistable dome faces the cationic hydrogel. The second face of the bistable dome faces the anionic hydrogel. In some embodiments, the system is configured so that when a fluid in contact with the system has a pH below a pKa of the cationic hydrogel, the cationic hydrogel exerts a pressure on the bistable dome, thereby causing the bistable dome to switch from its first state to its second state; and when a fluid in contact with the system has a pH above a pKa of the anionic hydrogel, the anionic hydrogel exerts a pressure on the bistable dome, thereby causing the bistable dome to switch from its second state to its first state. In some embodiments, the anionic hydrogel has a pKa of 7 to 10. In some embodiments, the anionic hydrogel includes poly(acrylic acid) (PAA) hydrogels, poly(methacrylic acid)(PMAA) hydrogels, and/or hyaluronic acid (HA) hydrogels. In some embodiments, the system further includes corrosion inhibitors disposed in the internal space. When the bistable dome is in the first state, the corrosion inhibitors are contained in the internal space, and when the bistable dome is in the second state, the corrosion inhibitors are released into the space outside the system.

In some embodiments, the protective casing is a cylinder and the system has a diameter of 1 cm to 5 cm and a height of 2 cm to 10 cm.

In some embodiments, the protective casing is a rectangle and the system has a length of 1 cm to 5 cm, a width of 1 cm to 5 cm and a height of 2 cm to 10 cm.

In some embodiments, the valve-like holes have a size of 0.01 μm to 10 μm.

In some embodiments, when the bistable dome is in the first state, the valve-like holes have a first size, and, when the bistable dome is in the second state, the valve-like holes have a second size larger than the first size.

In a second aspect, the disclosure provides an oil and gas system including a fluid, wherein a system of the disclosure is disposed in the fluid.

In a third aspect, the disclosure provides a method which includes disposing a system of the disclosure in a fluid in an oil and gas system, and switching the bistable dome from the first state to the second state, thereby releasing the corrosion inhibitors into the fluid.

DETAILED DESCRIPTION

Systems with a Bistable Dome and Cationic Hydrogel

Figure 1A:
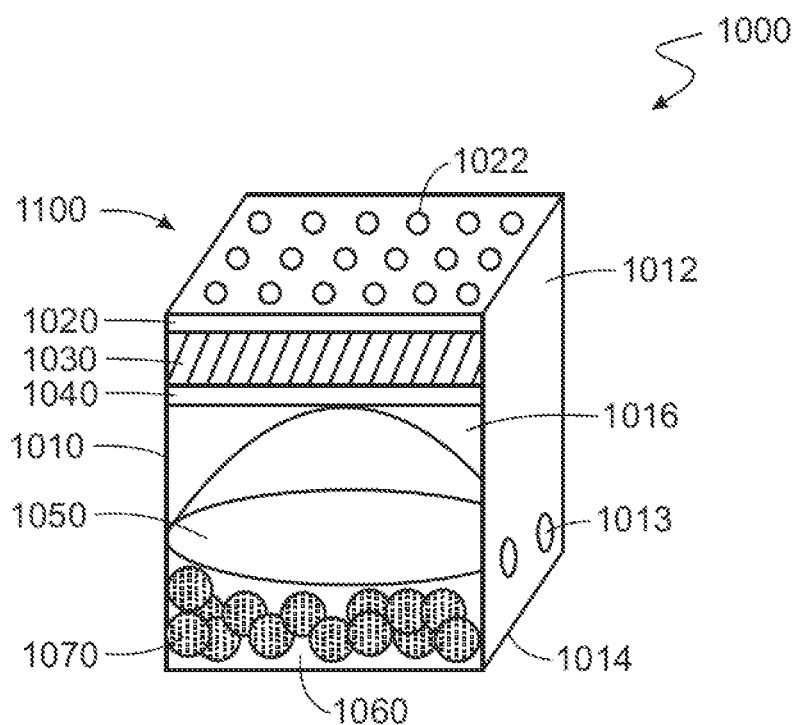
FIG. 1A depicts a schematic of a system.
Figure 1B:
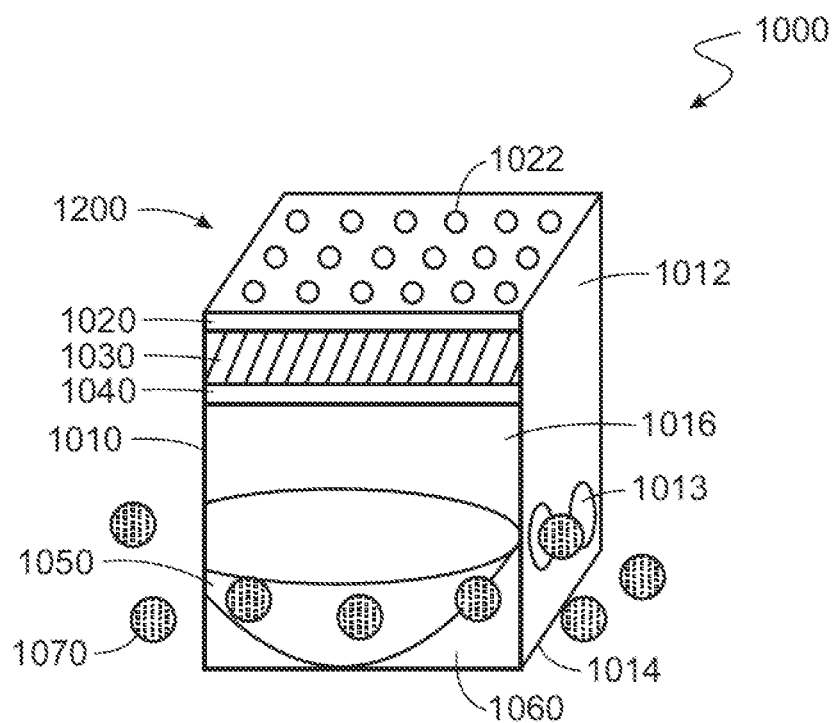
FIG. 1B depicts a schematic of a system.

FIGS. 1A and 1B depict schematics of a system 1000 that can exist in a first state 1100 (FIG. 1A) or a second state 1200 (FIG. 1B). The system 1000 has a protective casing 1010 that includes sidewalls 1012 and a bottom 1014. The system 1000 is in the form of a rectangle and the four sidewalls 1012 define a central channel 1016.

Disposed in the central channel 1016 are a porous membrane 1020 having pores 1022, a cationic hydrogel 1030, a flexible membrane 1040, a bistable dome 1050 and corrosion inhibitors 1070. As explained in more detail below, the bistable dome 1050 has a first state when the system 1000 is in its first state 1100 (FIG. 1A) and a second state when the system 1000 is in its second state 1200 (FIG. 1B). An internal space 1060 of the system 1000 is defined by the sidewalls 1012, the bottom 1014 and the bistable dome 1050.

Figure 1C:
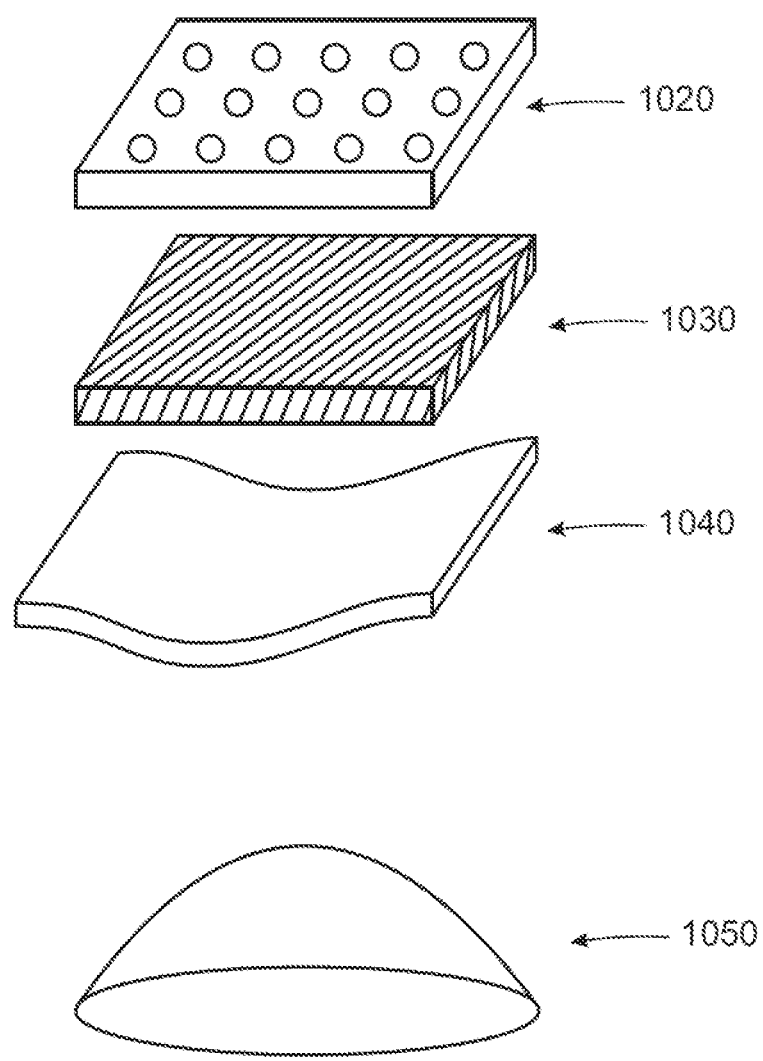
FIG. 1C depicts an exploded view of certain components of a system.

FIG. 1C depicts an exploded view of some of the components within the internal space 1060.

The sidewalls 1012 include valve-like holes 1013 (see discussion below) that can allow fluid communication with the internal space 1060 and a space outside the system 1000 under certain conditions. The size and positioning of the valve-like holes 1013 are such that when the system 1000 and bistable dome 1050 are in the first state 1100 (FIG. 1A), the internal space 1060 is not in fluid communication with the space outside the system 1000. However, when the system 1000 and bistable dome 1050 are in the second state 1200 (FIG. 1B), the internal space 1060 is in fluid communication with the space outside the system 1000 via the valve-like holes 1013. Generally, the valve-like holes 1013 are positioned level with or below the bistable dome's 1050 base, and the number of valve-like holes 1013 is selected as appropriate. The bottom 1014 is solid and does not include any valve-like holes.

When the system 1000 is in its first state 1100 and the bistable dome 1050 is in its first state (FIG. 1A), the corrosion inhibitors 1070 are contained in the internal space 1060. However, when the system 1000 is in its second state 1200 and the bistable dome is in its second state (FIG. 1B), the corrosion inhibitors 1070 can exit the internal space 1060 via the valve-like holes 1013 in the sidewalls 1012. While the corrosion inhibitors 1070 are depicted as large spheres for clarity, in general the corrosion inhibitors 1070 have a molecular size (see discussion below). Without wishing to be bound by theory, it is believed that in the first state 1100, the volume of the internal space 1060 is at its maximum. When the system 1000 and the bistable dome 1050 switch to the second state 1200, the volume of the internal space 1060 decreases relatively rapidly, creating a sudden increase in pressure. This pressure acts against the valve-like holes 1013, causing them to open and release the corrosion inhibitors 1070. Without wishing to be bound by theory, it is believed that the elastomeric nature of the valve-like holes 1013 allows them to deform in response to pressure, thereby controlling their size (see discussion below). One could consider the behavior of the valve-like holes 1013 to be similar to that of heart valves, which function to provide one-way flow. As depicted in FIGS. 1A and 1B, in some embodiments, the valve-like holes 1013 are a first size when the system 1000 is in its first state 1100 and the bistable dome 1050 is in its first state (FIG. 1A) and the valve-like holes 1013 are a second size larger than the first size when the system 1000 is in its second state 1200 and the bistable dome 1050 is in the second state (FIG. 1B). However, in certain embodiments, the valve-like holes 1013 are completely closed when the system 1000 is in its first state 1100 and the bistable dome 1050 is in its first state, and the valve-like holes 1013 are open when the system 1000 is in its second state 1200 and the bistable dome 1050 is in the second state.

The pores 1022 of the porous membrane 1020 allow for fluid communication between the cationic hydrogel 1030 and a fluid outside of the system 1000. Under relatively low pH conditions, the cationic hydrogel 1030 undergoes swelling in response to the relatively low pH conditions. The swelling of the cationic hydrogel 1030 exerts pressure on the bistable dome 1050 causing the system 1000 and the bistable dome 1050 to switch from the first state 1100 (FIG. 1A) to the second state 1200 (FIG. 1B). In some embodiments, the pressure exerted by the cationic hydrogel 1030 on the bistable dome 1050 can change relatively quickly, which can result in the relative quick release of the corrosion inhibitors 1070.

Without wishing to be bound by theory, it is believed that the cationic hydrogel 1030 can swell at a relatively low pH due to protonation of protonatable functional groups (e.g., amine functional groups, carboxyl functional groups). It is believed that the protonated positively charged moieties on the polymer chains cause repulsion and hence are responsible for swelling. Without wishing to be bound by theory, it is believed that the cationic hydrogel 1030 can swell at a pH below its acid dissociation constant (pKa). In certain embodiments, the cationic hydrogel 1030 has a pKa of at least 3 (e.g., at least 3.5, at least 4, at least 4.5, at least 5, at least 5.5) and/or at most 6 (e.g., at most 5.5, at most 5, at most 4.5, at most 4, at most 3.5). In some embodiments, the cationic hydrogel 1030 can swell at a pH below 5 (e.g., below 4, below 3, below 2, below 1).

Figure 2:
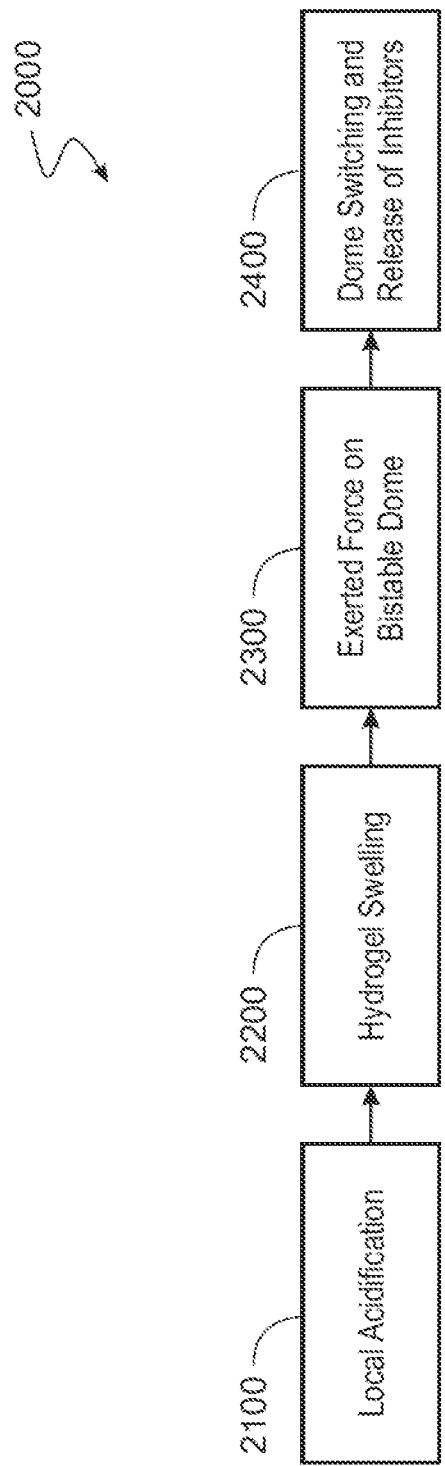
FIG. 2 depicts a flowchart of a method.

FIG. 2 depicts a flowchart for a method 2000 for the use of the system 1000. In step 2100, the environment of the system 1000 undergoes acidification. In step 2200, the cationic hydrogel 1030 undergoes swelling in response to the acidification of the surrounding environment. In step 2300, the swelling of the cationic hydrogel 1030 exerts a force on the bistable dome 1050. In step 2400, the system 1000 switches from its first state 1100 (FIG. 1A) to its second state 1200 (FIG. 1B), and the bistable dome switches from its first state to its second state. This causes the release of the corrosion inhibitors 1070.

Without wishing to be bound by theory, it is believed that in general, corrosion is driven by changes in pH (e.g., acidification). For example, in some cases, a reduction in pH can enhance corrosion. Thus, when the system 1000 encounters relatively low pH conditions, the system 1000 can release the corrosion inhibitors 1070 to try to counteract pH-induced corrosion.

Examples of the cationic hydrogel 1030 include chitosan, poly (ethylene imine), poly(amido-amine), poly(vinylpyrrolidone) (PVPP) and poly(lysine). In general, the cationic hydrogel 1030 can be synthesized using any appropriate cross-linking method, such as free radical polymerization, anionic polymerization, cationic polymerization, and atom transfer radical polymerization. The polymerization reaction can be light or thermally initiated. Monomers such as acrylic acid, acrylamide, or methacrylic acid, a crosslinking agent (e.g., N,N-methylenebisacrylamide), an initiator, and a catalyst can be mixed to initiate the reaction. Without wishing to be bound by theory, it is believed that the presence of a cationic group, such as carboxyl groups (—COOH), amine groups (—NH$_2$) quaternary ammonium groups (—NR$_3^+$), and guanidinium groups (—C(NH$_2$)$^{1+}$), imparts pH-sensitivity to the cationic hydrogel 1030. Post-polymerization, the cationic hydrogel 1030 can be shaped and sized as appropriate. Without wishing to be bound by theory, it is believed that the rate at which the cationic hydrogel 1030 responds depends on its size, shape, cross-linking density, number of ionic groups, and composition. All these parameters should be tuned for optimal performance, and the hydrogel sensitivity should be evaluated experimentally.

In general, the protective casing 1010 can be a robust material, such as a robust elastomer or a hard plastic, such as polyethylene glycol (PEG) and polyvinyl alcohol (PVA). The protective casing 1010 can be fabricated using injection molding or 3D printing. While the system 1000 and the protective casing 1010 are depicted as a rectangle, other shapes are possible. For example, in some embodiments, the system 1000 and the protective casing 1010 are a cylinder. The valve-like holes 1013 in the sidewalls 1012 can be created using a microfabrication technique, such as photolithography or etching. In certain embodiments, the valve-like holes 1013 have a size (e.g., diameter) of at least 0.01 (e.g., at least 0.02, at least 0.05, at least 0.1, at least 0.2, at least 0.5, at least 1, at least 2, at least 5) sun and/or at most 10 (e.g., at most 5, at most 2, at most 1, at most 0.5, at most 0.2, at most 0.1, at most 0.05, at most 0.02) µm. In certain embodiments, the valve-like holes 1013 have a size (e.g., diameter) of at least 0.01 (e.g., at least 0.02, at least 0.05, at least 0.1, at least 0.2, at least 0.5, at least 1, at least 2, at least 5) µm and/or at most 10 (e.g., at most 5, at most 2, at most 1, at most 0.5, at most 0.2, at most 0.1, at most 0.05, at most 0.02) µm, when the bistable dome 1050 is in the second state.

In general, the porous membrane 1020 is a non-deformable yet mechanically stable substrate such as a monofilament polyester gauze, which allows the cationic hydrogel 1030 to be in fluid contact with a fluid external to the system 1000 while holding the cationic hydrogel 1030 in place. The gauze can be cast into a PDMS matrix and further processed as a common PDMS layer. The porous membrane 1020 can also be fabricated from porous ceramics or sintered polymers that can endure the conditions in which the system 1000 operates. The choice of material and the pore size would be determined by the nature of the specific application. The selection of pore size can be dictated by the external environment and/or the desired response time. Although, in general, larger pores can allow faster diffusion and consequently a decrease in the sensor response time, they may allow unwanted debris to enter the internal space 1060.

The fabrication method could involve processes such as sintering, foaming, or 3D printing. For example, ceramic covers can be made by sintering together small particles under high heat and pressure, while polymer covers could be created via 3D printing. In some embodiments, the size (e.g., diameter) of the pores 1022 of the porous membrane 1020 are at least 0.1 (e.g., at least 0.2, at least 0.3, at least 0.4, at least 0.5, at least 0.6, at least 0.7, at least 0.8, at least 0.9, at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5, at least 10, at least 15, at least 20, at least 25, at least 30, at least 35, at least 40, at least 45) µm and/or at most 50 (e.g., at most 45, at most 40, at most 35, at most 30, at most 25, at most 20, at most 15, at most 10, at most 9.5, at most 9, at most 8.5, at most 8, at most 7.5, at most 7, at most 6.5, at most 6, at most 5.5, at most 5, at most 4.5, at most 4, at most 3.5, at most 3, at most 2.5, at most 2, at most 1.5, at most 1, at most 0.9, at most 0.8, at most 0.7, at most 0.6, at most 0.5, at most 0.4, at most 0.3, at most 0.2) µm. Without wishing to be bound by theory, it is believed that the diameter of the pores 1022 should allow for sufficient fluid exchange while ensuring that the cationic hydrogel 1030 cannot escape the system 1000 and contaminants cannot enter the system 1000.

In some embodiments, the cationic hydrogel 1030 can be synthesized directly onto the porous membrane 1020, for example by performing the polymerization reaction on the porous membrane 1020 itself, to create a bond (e.g., a relatively robust bond) between the porous membrane 1020 and the cationic hydrogel 1030.

Without wishing to be bound by theory, it is believed that during use of the system 1000 the porous membrane 1020 directs the expansion of the cationic hydrogel 1030 to effectively transfer the generated force to the bistable dome 1050, regulates the contact rate of the fluid surrounding the system 1000 with the cationic hydrogel 1030, and filters larger contaminants while allowing the passage of the surrounding fluid.

In general, the flexible membrane 1040 is an elastomeric material with good flexibility and resilience, such as polydimethylsiloxane (PDMS), silicone or polyurethane. The flexible membrane 1040 can be produced by injection molding, casting, or 3D printing. The thickness of the flexible membrane 1040 can be adjusted for desired mechanical attributes such as flexibility and durability.

Without wishing to be bound by theory, it is believed that the flexible membrane 1040 provides a buffer between the cationic hydrogel 1030 and the bistable dome 1050, ensuring relatively even force transmission from the swelling of the cationic hydrogel 1030 to the bistable dome 1050.

The bistable dome 1050 is generally an elastomeric material and generally possesses two equilibrium states, as shown in the first state 1100 (FIG. 1A) and the second state 1200 (FIG. 1B). Examples of the materials for the bistable dome 1050 include silicone, polyurethane, and thermoplastic elastomers. The bistable dome 1050 can be fabricated using any appropriate technique, such as injection molding, casting, or 3D printing. The actuation force to trigger switching can be tuned by the geometric properties, such as the angular opening of the shell, radius, thickness, as given by the equation below. Without wishing to be bound by theory, it is believed that the force needed to switch the bistable dome 1050 between its first and second states generally depends on geometric parameters, such as the angular opening of the shell, radius, thickness, and can be acquired using the dimensionless parameter $$\lambda_d = [12(1-v^2)]^{1/4} \varnothing \sqrt{R/h}$$

that characterizes the ratio of stretching to bending energy (a measure of the energy required to deform the structure by bending and how the materials responds to deformation), where v is the poison ratio, R is the radius of curvature, Ø is the angular opening, and h is the shell thickness. It has been reported in Taffetani, M., Jiang, X., Hohnes. D. P., & Vella, D. (2018). Static bistability of spherical caps. *Proceedings of the Royal Society A: Mathematical, Physical and Engineering Sciences*, 474(2213), 20170910, that a value of $\lambda_d \approx 1.44v+5.06$ allows a bistable dome to become bistable, and therefore allows the dome to transition from being monostable (having only one stable state) to bistable where the dome can maintain its shape in either state without the need for continuous external force. Alternatively, the force can be determined by finite element simulation and/or experimentation.

The bistable dome 1050 can be fabricated through pre-strain release strategy. In this method, a circular disk is first equi-biaxially pre-stretched and bonded to a stress-free layer on top. The release of the pre-strain results in a 3D dome structure. Alternatively, a casting process using molds can be used to manufacture the bistable dome 1050.

The flexible membrane 1040 and the bistable dome 1050 can be adhered to the cationic hydrogel 1030 using an appropriate adhesive (e.g., cyanoacrylate, silicone, a UV-curable adhesive) that complements the materials, offers sufficient bonding strength, and can endure environmental conditions. The protective casing 1010, can be sealed onto the other components using a similar adhesive. The protective casing 1010 is placed to ensure alignment of the valve-like holes 1013 with the bistable dome's 1050 contours, such that fluid communication can be established between the internal space 1060 and the space outside the system 1000 in the second state 1200.

In general, the corrosion inhibitors 1070 can be any type of corrosion inhibitor. Examples of the corrosion inhibitors 1070 include imidazoline derivatives amines, benzotriazole (BTA), and tolyltriazole (TTA). In certain embodiments, the corrosion inhibitors 1070 are at least 0.5 (e.g., at least 1, at least 1.5) nm and/or at most 2 (e.g., at most 1.5, at most 1) un in size. In certain embodiments, the corrosion inhibitors 1070 are encapsulated. In certain embodiments, the encapsulated corrosion inhibitors 1070 are at least 0.1 (e.g., at least 0.2, at least 0.5, at least 1, at least 1.5, at least 2, at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5) μm and/or at most 10 (e.g., at most 9.5, at most 9, at most 8.5, at most 8, at most 7.5, at most 7, at most 6.5, at most 6, at most 5.5, at most 5, at most 4.5, at most 4, at most 3.5, at most 3, at most 2.5, at most 2, at most 1.5, at most 1, at most 0.5, at most 0.2) μm in size.

Generally, the amount of corrosion inhibitors 1070 disposed in the system 1000 is determined based on information from an individual with appropriate technical training, such as, for example, a corrosion engineer. In general, it is desirable that the concentration of the corrosion inhibitors 1070 does not exceed its solubility limit in the system 1000 to avoid any precipitation or crystallization that could potentially block the valve-like holes 1013 and hinder the corrosion inhibitors' 1070 release. In certain embodiments, a concentration of corrosion inhibitors 1070 solution in the system 1000 is at least 5 (e.g., at least 10, at least 15, at least 20, at least 25) wt. % and/or at most 30 (e.g., at most 25, at most 20, at most 15, at most 10) wt. %.

In general, the dimensions of the system 1000 can be adjusted based on the desired volume for the internal space 1060 and/or amount of corrosion inhibitors 1070. Generally, the dimensions of the protective casing 1010 determine the size of the system 1000.

In some embodiments, the system 1000 and the protective casing 1010 are in the form of a cylinder (see discussion above). In such embodiments, the system 1000 and/or the protective casing 1010 can have a diameter of at least 1 (e.g., at least 1.5, at least 2, at least 2.5, at least 3, at least 3.5, at least 4, at least 4.5) cm and/or at most 5 (e.g., at most 4.5, at most 4, at most 3.5, at most 3, at most 2.5, at most 2, at most 1.5) cm. In such embodiments, the system 1000 and/or the protective casing 1010 can have a height of at least 2 (e.g., at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5) cm and/or at most 10 (e.g., at most 9.5, at most 9, at most 8.5, at most 8, at most 7.5, at most 7, at most 6.5, at most 6, at most 5.5, at most 5, at most 4.5, at most 4, at most 3.5, at most 3, at most 2.5) cm.

In some embodiments, the system 1000 and the protective casing 1010 are in the form of a rectangle (as depicted in FIGS. 1A and 1B). In such embodiments, the system 1000 and/or the protective casing 1010 can have a length of at least 1 (e.g., at least 1.5, at least 2, at least 2.5, at least 3, at least 3.5, at least 4, at least 4.5) cm and/or at most 5 (e.g., at most 4.5, at most 4, at most 3.5, at most 3, at most 2.5, at most 2, at most 1.5) cm. In such embodiments, the system 1000 and/or the protective casing 1010 can have a width of at least 1 (e.g., at least 1.5, at least 2, at least 2.5, at least 3, at least 3.5, at least 4, at least 4.5) cm and/or at most 5 (e.g., at most 4.5, at most 4, at most 3.5, at most 3, at most 2.5, at most 2, at most 1.5) cm. In some embodiments, the system 1000 and/or the protective casing 1010 has a height of at least 2 (e.g., at least 2.5, at least 3, at least 3.5, at least 4, at least 4.5, at least 5, at least 5.5, at least 6, at least 6.5, at least 7, at least 7.5, at least 8, at least 8.5, at least 9, at least 9.5) cm and/or at most 10 (e.g., at most 9.5, at most 9, at most 8.5, at most 8, at most 7.5, at most 7, at most 6.5, at most 6, at most 5.5, at most 5, at most 4.5, at most 4, at most 3.5, at most 3, at most 2.5) cm.

In certain embodiments, the thickness of the porous membrane 1020 is at least 0.1 (e.g., at least 0.2, at least 0.3, at least 0.4) mm and/or at most 0.5 (e.g., at most 0.4, at least 0.3, at least 0.2) mm.

In certain embodiments, the system 1000 is a cylinder and the porous cover 1020 has a diameter of at least 1 (e.g., at least 1.5, at least 2, at least 2.5, at least 3, at least 3.5, at least 4, at least 4.5) cm and/or at most 5 (e.g., at most 4.5, at most 4, at most 3.5, at most 3, at most 2.5, at most 2, at most 1.5) cm.

In certain embodiments, the system 1000 is a rectangle and the porous cover 1020 has a length of at least 1 (e.g., at least 1.5, at least 2, at least 2.5, at least 3, at least 3.5, at least 4, at least 4.5) cm and/or at most 5 (e.g., at most 4.5, at most 4, at most 3.5, at most 3, at most 2.5, at most 2, at most 1.5) cm.

In certain embodiments, the system 1000 is a rectangle and the porous cover 1020 has a width of at least 1 (e.g., at least 1.5, at least 2, at least 2.5, at least 3, at least 3.5, at least 4, at least 4.5) cm and/or at most 5 (e.g., at most 4.5, at most 4, at most 3.5, at most 3, at most 2.5, at most 2, at most 1.5) cm.

In certain embodiments, the thickness of the flexible membrane 1040 is at least 0.2 (e.g., at least 0.3, at least 0.4, at least 0.5, at least 0.6, at least 0.7, at least 0.8, at least 0.9) mm and/or at most 1 (e.g., at most 0.9, at most 0.8, at most 0.7, at most 0.6, at most 0.5, at most 0.4, at most 0.3) mm.

In certain embodiments, the system 1000 is a cylinder and the flexible membrane 1040 has a diameter of at least 1 (e.g., at least 1.5, at least 2, at least 2.5, at least 3, at least 3.5, at least 4, at least 4.5) cm and/or at most 5 (e.g., at most 4.5, at most 4, at most 3.5, at most 3, at most 2.5, at most 2, at most 1.5) cm.

In certain embodiments, the system 1000 is a rectangle and the flexible membrane 1040 has a length of at least 1 (e.g., at least 1.5, at least 2, at least 2.5, at least 3, at least 3.5, at least 4, at least 4.5) cm and/or at most 5 (e.g., at most 4.5, at most 4, at most 3.5, at most 3, at most 2.5, at most 2, at most 1.5) cm.

In certain embodiments, the system 1000 is a rectangle and the flexible membrane 1040 has a width of at least 1 (e.g., at least 1.5, at least 2, at least 2.5, at least 3, at least 3.5, at least 4, at least 4.5) cm and/or at most 5 (e.g., at most 4.5, at most 4, at most 3.5, at most 3, at most 2.5, at most 2, at most 1.5) cm.

In certain embodiments, the height of the bistable dome 1050 is at least 1 (e.g., at least 2, at least 3, at least 4) cm and/or at most 5 (e.g., at most 4, at most 3, at most 2) cm.

In certain embodiments, the system 1000 is a cylinder and the bistable dome 1050 has a diameter of at least 0.8 (e.g., at least 1, at least 1.5, at least 2, at least 2.5, at least 3, at least 3.5, at least 4, at most 4.5) cm and/or at most 4.8 (e.g., at most 4.5, at most 4, at most 3.5, at most 3, at most 2.5, at most 2, at most 1.5, at most 1) cm.

In certain embodiments, the system 1000 is a rectangle and the bistable dome 1050 has a length of at least 0.8 (e.g., at least 1, at least 1.5, at least 2, at least 2.5, at least 3, at least 3.5, at least 4, at least 4.5) cm and/or at most 4.8 (e.g., at most 4.5, at most 4, at most 3.5, at most 3, at most 2.5, at most 2, at most 1.5, at most 1) cm.

In certain embodiments, the system 1000 is a rectangle and the bistable dome 1050 has a width of at least 0.8 (e.g., at least 1, at least 1.5, at least 2, at least 2.5, at least 3, at least 3.5, at least 4, at least 4.5) cm and/or at most 4.8 (e.g., at most 4.5, at most 4, at most 3.5, at most 3, at most 2.5, at most 2, at most 1.5, at most 1) cm.

Systems with Anionic Hydrogel

Figure 3A:
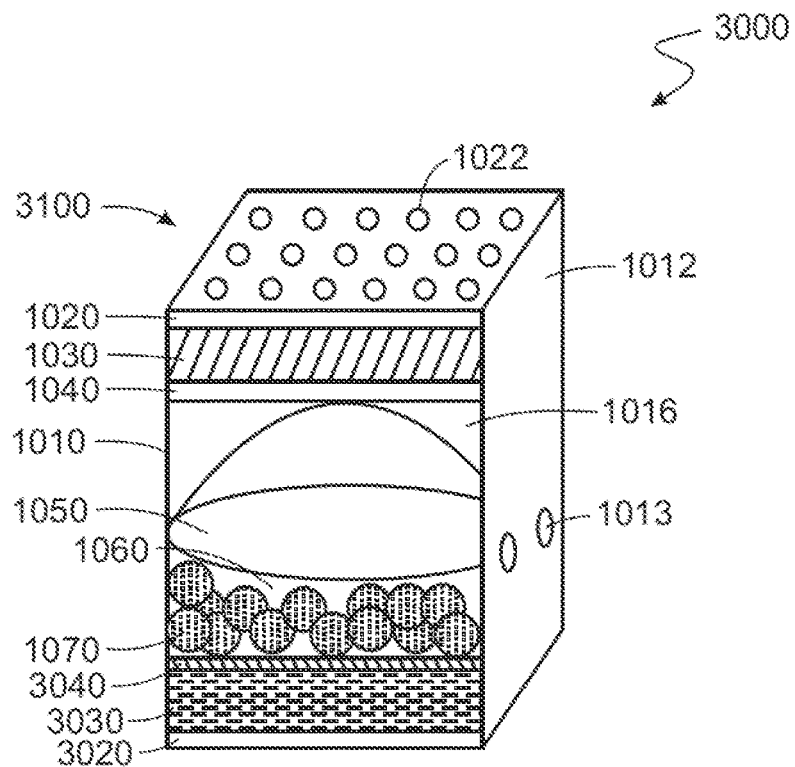
FIG. 3A depicts a schematic of a system.
Figure 3B:
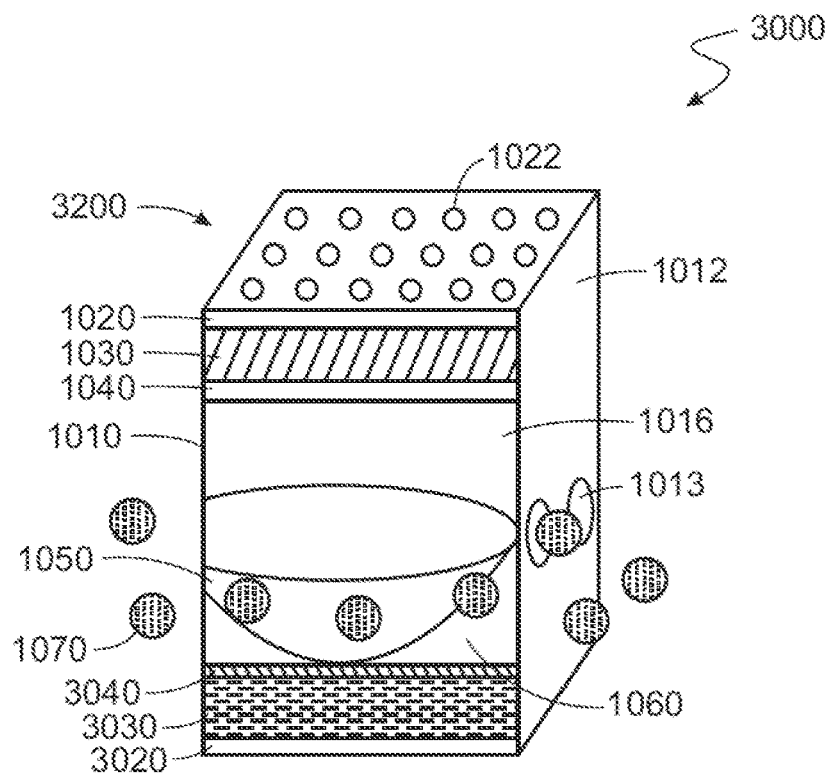
FIG. 3B depicts a schematic of a system.

FIGS. 3A and 3B depict schematics of a system 3000 that can exist in a first state 3100 or a second state 3200. The system 3000 includes the components of the system 1000. However, instead of the protective casing 1010 including a bottom 1014, the system 3000 has a porous membrane 3020, an anionic hydrogel 3030 and a flexible membrane 3040.

Like in the system 1000, in the system 3000, the pores 1022 of the porous membrane 1020 allows for fluid communication between the cationic hydrogel 1030 and a fluid outside of the system 3000. Under relatively low pH conditions, the cationic hydrogel 1030 undergoes swelling in response to the relatively low pH conditions. The swelling of the cationic hydrogel 1030 exerts pressure on the bistable dome 1050 causing the system 3000 and the bistable dome 1050 to switch from the first state 3100 to the second state 3200 and allow for the release of corrosion inhibitors 1070 in the internal space 1060 from the system 3000.

The porous membrane 3020 allows for fluid communication between the anionic hydrogel 3030 and a fluid outside of the system 3000. Under relatively high pH conditions, the anionic hydrogel 3030 undergoes swelling in response to the relatively high pH conditions. The swelling of the anionic hydrogel 3030 exerts pressure on the bistable dome 3050 causing the system 3000 and the bistable dome 1050 to switch from the second state 3200 to the first state 3100. When the system 3000 switches back to the first state 3100, the corrosion inhibitors 1070 is no longer able to exit the system 3000 via the valve-like holes 1013 of the sidewalls 1012. Thus, under relatively high pH conditions, the system 3000 can stop the release of the corrosion inhibitors 1070.

Without wishing to be bound by theory, it is believed that the swelling of the anionic hydrogel 3030 is caused by the deprotonation of anionic functional groups present in the hydrogel network. It is believed that the anionic (negatively charged) functional groups then repel each other leading to expansion of the hydrogel. Examples of the anionic functional groups include carboxylic groups (—COOH), sulfonic acid groups (—$SO_3H$), and phosphonic acid groups (—$PO_3H_2$).

The system 3000 is able to continuously alternate between the first state 3100 and the second state 3200 depending on the pH of the surrounding environment.

As discussed above, without wishing to be bound by theory, it is believed that in the first state 3100, the volume of the internal space 1060 is at its maximum. When the system 3000 and the bistable dome 1050 switch to the second state 3200, the volume of the internal space 1060 decreases relatively rapidly, creating a sudden increase in pressure. This pressure acts against the valve-like holes 1013, causing them to open and/or open further and release the corrosion inhibitors 1070. After the system 3000 and the bistable dome 1050 returns to the first state 3100, the volume of the internal space 1060 increases causing the pressure to decrease. This allows the valve-like holes 1013 to return to their initial state (completely closed or smaller diameter), preventing the corrosion inhibitors 1070 from reentering and also preventing any outside materials from entering to internal space 1060.

Examples of anionic hydrogels include poly(acrylic acid) (PAA) hydrogels, poly(methacrylic acid) (PMAA) hydrogels, and hyaluronic acid (HA) hydrogels. Without wishing to be bound by theory, it is believed that the anionic hydrogel 3030 can swell at a pH greater than its pKa. In certain embodiments, the anionic hydrogel 3030 has a pKa of at least 7 (e.g., at least 7.5, at least 8, at least 8.5, at least 9, at least 9.5) and/or at most 10 (e.g., at most 9.5, at most 9, at most 8.5, at most 8, at most 7.5). In certain embodiments, the anionic hydrogel 3030 can swell at a pH above 7 (e.g., above 8, above 9, above 10, above 11, above 12).

Applications in Oil and Gas Systems

The system(s) 1000 and/or 3000 can be employed in any oil and gas production, transportation, processing and/or storage system that could potentially be susceptible to corrosion. For example, in some embodiments, the system(s) 1000 and/or 3000 can be disposed in an oil and gas pipelines, storage tanks and vessels, refinery processing equipment, well casings and tubing, and transportation infrastructure such as shipping vessels and tanks to prevent corrosion therein. In some embodiments, corrosion is caused by the presence of $CO_2$, $H_2S$, chlorides, acids, and/or bacteria in an aqueous solution. In some embodiments, the system(s) 1000 and/or 3000 is disposed in a fluid present in an oil and gas system.

In some embodiments, the system(s) 1000 and/or 3000 can be introduced into an oil and gas system via a batch treatment or a continuous treatment. In a batch treatment, a relatively large amount of the system(s) 1000 and/or 3000 is injected at once. In a continuous treatment, the system(s) 1000 and/or 3000 is injected at regular intervals in smaller amounts.

OTHER EMBODIMENTS

While certain embodiments have been disclosed above, the disclosure is not limited to such embodiments.

As an example, while embodiments have been disclosed in which the release of the corrosion inhibitors 1070, is triggered by changes in pH, the disclosure is not limited to such embodiments. In certain embodiments, in addition to or in alternative to pH, a hydrogel, can swell in response to changes in temperature and/or ionic strength. Thus, in addition to or in alterative to certain pH conditions, the system 1000 and the bistable dome 1050 can switch from the first state 1100 to the second state 1200 and release the corrosion inhibitors 1070 in response to changes in the temperature and/or ionic strength.

Without wishing to be bound by theory, it is believed that hydrogels can be designed to respond to one or more stimuli including pH, temperature and ionic strength. Temperature responsive hydrogels include PNIPAM hydrogels, and ionic strength-responsive hydrogels include polyelectrolyte (PAA) or poly (methacrylic acid) (PMAA). Dual responsive hydrogels include hydrogels made of copolymer of both a temperature responsive component (e.g., PNIPAM) and a pH responsive hydrogel (e.g., acrylic acid).

Without wishing to be bound by theory, it is believed that temperature responsive hydrogels can swell and shrink due to changes in the balance between hydrophilic and hydrophobic interactions in the polymer network. Without wishing to be bound by theory, it is believed that ionic responsive hydrogel swell and shrink due to changes in electrostatic charges in charged groups on polymer chains. It is believed that increased ionic strength shields charges leading to reduced repulsion, causing the hydrogel to shrink.

As another example, while embodiments have been disclosed in which the systems of the disclosure are applied in oil and gas systems and applications, the disclosure is not limited to such embodiments. In some embodiments, the system(s) 1000 and/or 3000 can be used for the localized administration of drugs and therapeutic agents. In some embodiments, system(s) 1000 and/or 3000 can be used as a microfluidic valve to control flow in different microelectromechanical systems (MEMS) and engineering applications.

As a further, example, in some embodiments, in addition to, or in alternative to, corrosion inhibitors 1070 being stored in the internal space 1060, an additional agent (e.g., an anti-microbial agent, a scale inhibitor) can be stored in the stored internal space 1060. Generally, such an additional agent is compatible in size and chemistry with the system and corrosion inhibitors 1070, respectively.

What is claimed:

1. A system, comprising:
   a protective casing comprising sidewalls comprising valve-like holes, the sidewalls defining a central channel, the central channel comprising:
   a bistable dome configured to have a first state and a second state different from the first state;
   a cationic hydrogel; and
   an internal space defined by the sidewalls of the protective casing and the bistable dome;
   wherein:
   at least a portion of cationic hydrogel is in fluid communication with a space outside the system;
   in the first state of the bistable dome, the internal space is not in fluid communication with the space outside the system; and
   in the second state of the bistable dome, the internal space is in fluid communication with the space outside the system via the valve-like holes.

2. The system of claim 1, further comprising a porous cover, wherein:
   the cationic hydrogel comprises first and second faces;
   the first face of the cationic hydrogel faces the bistable dome;
   the second face of the cationic hydrogel faces the space outside the system; and
   the porous cover is disposed on the second face of the cationic hydrogel.

3. The system of claim 2, wherein pores of the porous cover have a size of 0.1 µm to 50 µm.

4. The system of claim 2, further comprising a flexible membrane disposed on the first face of the cationic hydrogel.

5. The system of claim 1, wherein the system is configured so that, when a fluid in contact with the system has a pH below a pKa of the cationic hydrogel, the cationic hydrogel exerts a pressure on the bistable dome, thereby causing the bistable dome to switch from its first state to its second state.

6. The system of claim 5, wherein:
   the system further comprises corrosion inhibitors disposed in the internal space;
   when the bistable dome is in the first state, the corrosion inhibitors are contained in the internal space; and
   when the bistable dome is in the second state, the corrosion inhibitors are released into the space outside the system.

7. The system of claim 1, wherein the cationic hydrogel has a pKa of 3 to 6.

8. The system of claim 1, wherein the cationic hydrogel comprises a member selected from the group consisting of chitosan, poly (ethylene imine), poly(amido-amine), poly (vinylpyrrolidone) (PVPP) and poly(lysine).

9. The system of claim 1, further comprising corrosion inhibitors disposed in the internal space, wherein:
   when the bistable dome is in the first state, the corrosion inhibitors are contained in the internal space; and
   when the bistable dome is in the second state, the corrosion inhibitors are released into the space outside the system.

10. The system of claim 1, further comprising an anionic hydrogel disposed in the protective casing, wherein:
    at least a portion of the anionic hydrogel is in fluid communication with the space outside the system;
    the bistable dome comprises first and second faces;
    the first face of the bistable dome faces the cationic hydrogel; and
    the second face of the bistable dome faces the anionic hydrogel.

11. The system of claim 10, wherein the system is configured so that:
    when a fluid in contact with the system has a pH below a pKa of the cationic hydrogel, the cationic hydrogel exerts a pressure on the bistable dome, thereby causing the bistable dome to switch from its first state to its second state; and
    when a fluid in contact with the system has a pH above a pKa of the anionic hydrogel, the anionic hydrogel exerts a pressure on the bistable dome, thereby causing the bistable dome to switch from its second state to its first state.

12. The system of claim 10, wherein the anionic hydrogel has a pKa of 7 to 10.

13. The system of claim 10, wherein the anionic hydrogel comprises poly(acrylic acid) (PAA) hydrogels, poly(methacrylic acid) (PMAA)hydrogels, and hyaluronic acid (HA) hydrogels.

14. The system of claim 10, further comprising corrosion inhibitors disposed in the internal space, wherein:
when the bistable dome is in the first state, the corrosion inhibitors are contained in the internal space; and
when the bistable dome is in the second state, the corrosion inhibitors are released into the space outside the system.

15. The system of claim 1, wherein the protective casing is a cylinder and the system has a diameter of 1 cm to 5 cm and a height of 2 cm to 10 cm.

16. The system of claim 1, wherein the protective casing is a rectangle and the system has a length of 1 cm to 5 cm, a width of 1 cm to 5 cm and a height of 2 cm to 10 cm.

17. The system of claim 1, wherein:
when the bistable dome is in the first state, the valve-like holes have a first size; and
when the bistable dome is in the second state, the valve-like holes have a second size larger than the first size.

18. The system of claim 1, wherein in the second state the valve-like holes have a size of 0.01 µm to 10 µm.

19. A system, comprising:
a fluid,
wherein:
the system is an oil and gas system; and
the system of claim 1 is disposed in the fluid.

20. A method, comprising:
disposing the system of claim 9 in a fluid in an oil and gas system; and
switching the bistable dome from the first state to the second state, thereby releasing the corrosion inhibitors into the fluid.

* * * * *